W. E. MILLER.
GRIPPING DEVICE.
APPLICATION FILED AUG. 12, 1912.

1,073,156.

Patented Sept. 16, 1913.

2 SHEETS—SHEET 1.

WITNESSES
Victoria Londen
Vera E. Fogg

INVENTOR
William E. Miller
BY
ATTY.

W. E. MILLER.
GRIPPING DEVICE.
APPLICATION FILED AUG. 12, 1912.

1,073,156.

Patented Sept. 16, 1913.

2 SHEETS—SHEET 2.

WITNESSES
Victoria Lowden
Vera E. Fogg

INVENTOR
William E. Miller
BY
ATTY.

UNITED STATES PATENT OFFICE.

WILLIAM E. MILLER, OF PROVIDENCE, RHODE ISLAND.

GRIPPING DEVICE.

1,073,156.  Specification of Letters Patent.  Patented Sept. 16, 1913.

Application filed August 12, 1912. Serial No. 714,512.

*To all whom it may concern:*

Be it known that I, WILLIAM E. MILLER, a citizen of the United States, residing at Providence, county of Providence, State of Rhode Island, have invented certain new and useful Improvements in Gripping Devices, of which the following is a specification.

This invention relates to such apparatus as cable driven amusement rides and particularly to the gripping and dropping of an elevating cable employed to run a gravity car up an incline.

The devices which form the subject matter of my present invention are particularly adapted to a form of amusement apparatus which has become known as an aeroplane ride, the same consisting of a car approximating an aeroplane in appearance running by gravity over an inclined track and raised by cable to elevated points. In apparatus of this sort, where the smoothness of the glide of the aeroplane is desired in order to carry out the proper sensation of the ride, the picking up and losing of the positive means of traction must be accomplished without shock or jar. The necessity for a firm grip upon and a complete release from the cable is, of course, equally imperative. To the end, therefore, of providing a gripping mechanism having the points desired, I have devised my present invention.

The construction and operation of the device will be more fully described in the specification which follows.

In the drawings which form a part of the specification I have illustrated my invention as applied to a car of the type used in my aeroplane ride.

Figure 1:
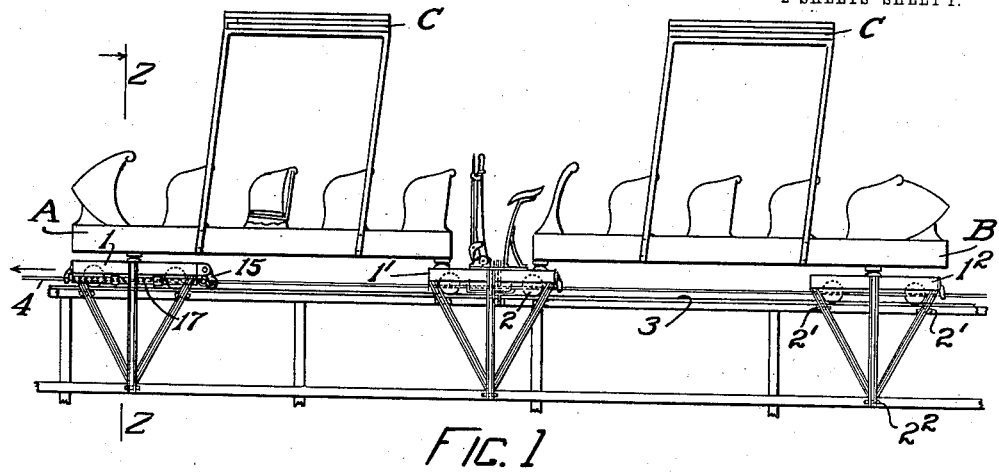
Figure 2:
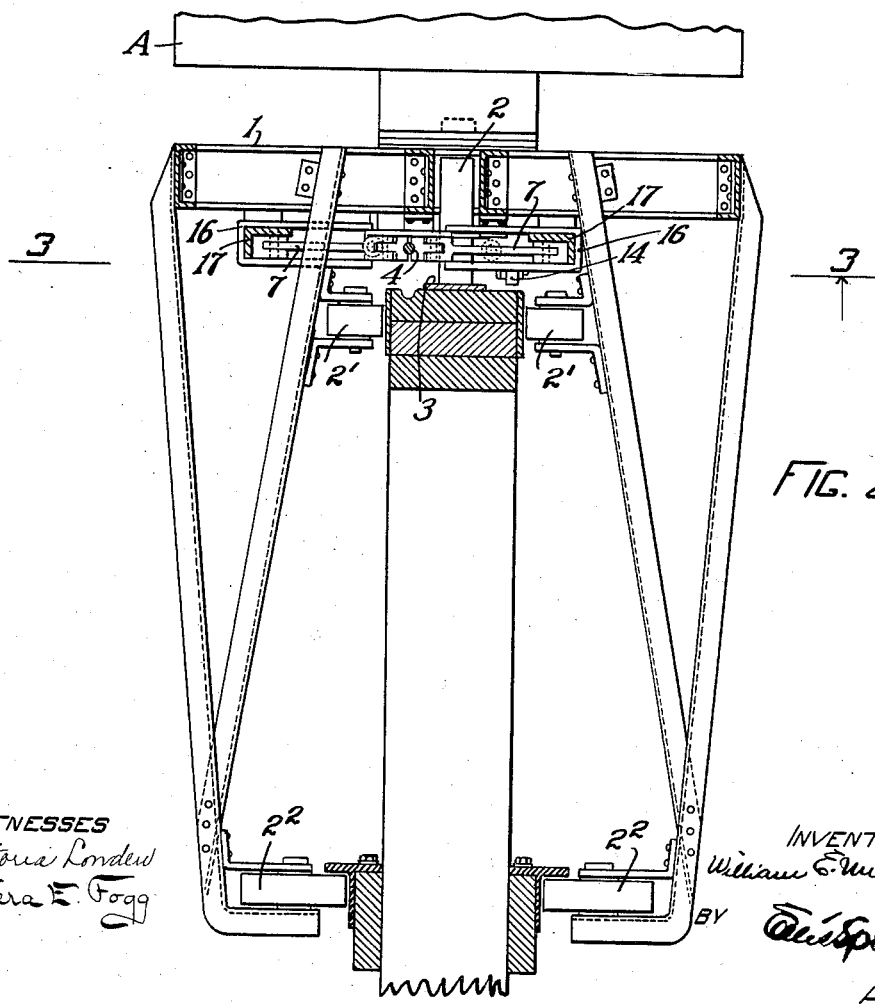
Figure 3:
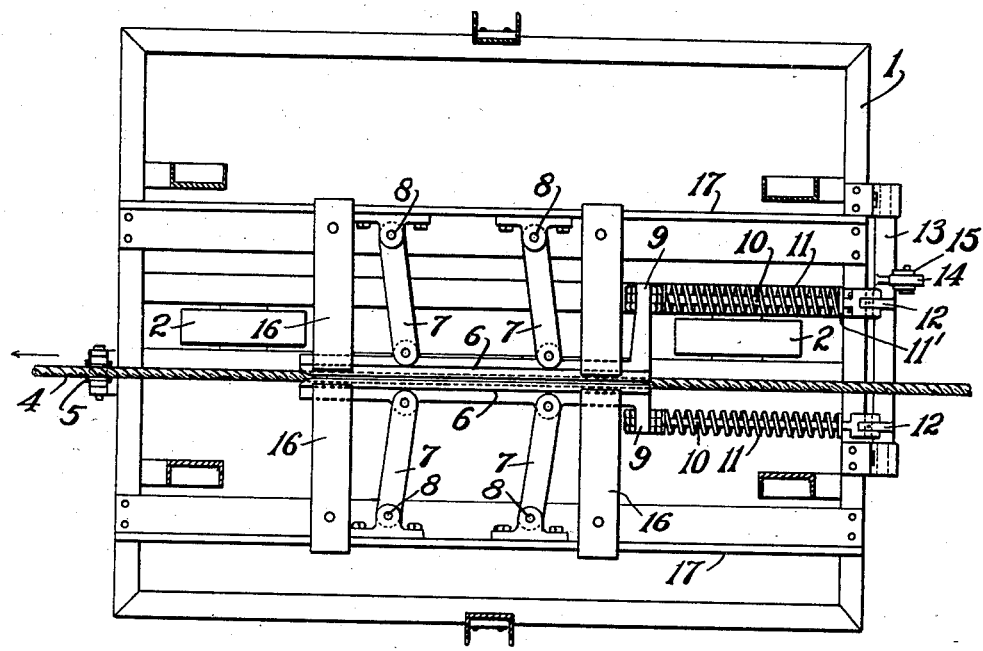
Figure 4:
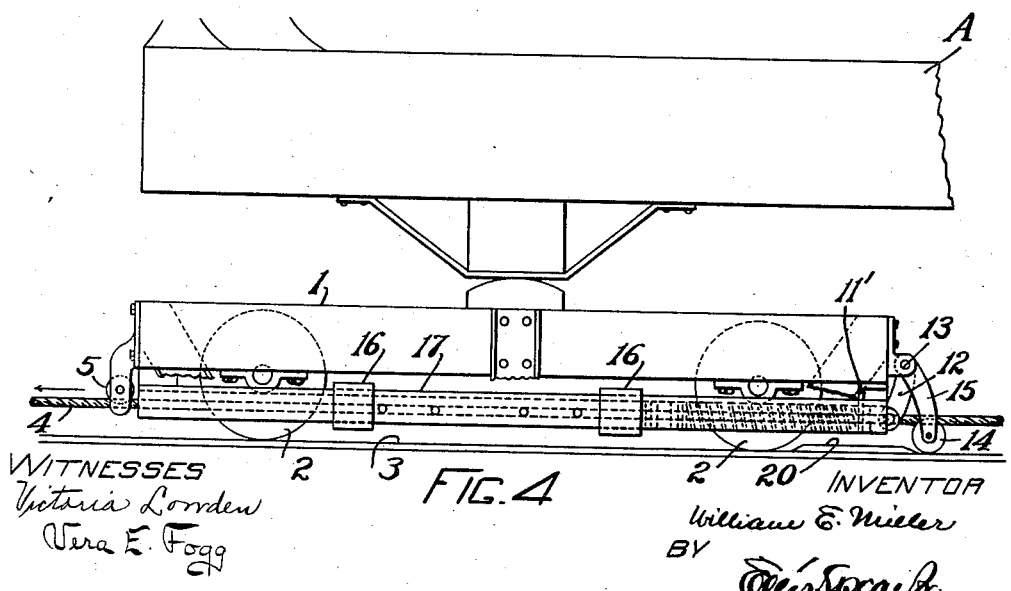

Throughout specification and drawings like reference numerals are employed to indicate corresponding parts and in the drawings:—Figure 1 is a side view of a two-section car, on a track, of the type used in my aeroplane ride, Fig. 2 is a section on the line 2—2, Fig. 1 showing the car truck, grip, rail and guides, Fig. 3 is a bottom view of a portion of the car truck on the line 3—3, Fig. 2, and Fig. 4 is a side elevation of the truck and a portion of the car body and track.

The cars shown comprise a forward section A and a rear section B mounted on trucks 1, $1^1$ and $1^2$. The truck 1 is under the forward part of the forward car A, and the truck $1^1$ carries the rear end of the forward car A and the forward end of the rear car B, while the truck $1^2$ carries the rear end of the rear car B. The wheels 2 of the trucks run on an upper track plate 3 which is laid on the timbers which form the rail of the trackway. Guiding rollers $2^1$ bear against lateral plates $3^1$ for steadying the car, and rollers $2^2$ run beneath the flange of an angle iron $3^3$ still further steadying the car and preventing it from jumping the track.

The cable 4 is run along the top of the rail, normally lying in a groove therein. A small grooved pulley 5 is mounted on the forward end of the truck frame 1 adapted to receive the cable 4 when it is held by the grip jaws 6. The jaws 6 are pivotally supported by links 7 which are pivoted at 8 to brackets on the frame of the truck. At their rearward end the jaws 6 are provided with outwardly turned flanges 9 from which rods 10 surrounded by spiral springs 11 connect with a short arm 12 of a rock shaft 13. The springs 10 are located with their forward ends adjacent the extensions 9 and with their rear ends against a flange $11^1$ through which the rod 10 extends. The jaws are, therefore, normally thrust forward and owing to the fact that the links 7 are of greater length than the distance from the pivot 8 to the cable they approach as they swing forward gripping the cable just before they reach a position at right angles to the cable. The rock shaft 13 has an arm 15 on which is mounted a roller 14. This roller is adapted to engage with a raised plate 20 set at suitable points on the track 3 for the opening of the clutch. The brackets of the pivot 8 are bolted to angle irons 17 which run transversely of the truck and the jaws 6 are suitably guided between frames 16 which extend inwardly from the angle irons 17 toward the area of engagement and overlap the jaws 6.

In operation my grip is normally closed. When the cars A and B descend the inclined track by gravity there is secured a gliding effect which carries out the impression of the aeroplane as fostered by the apparent planes C which are supported above the cars in approximation of the construction of an aeroplane. As the car approaches an incline the cable 4 is raised slightly from the track until it lodges against the pulley 5 in which position it runs between the gripping jaws 6. As soon as the cable has had a chance to properly locate itself the roller 14 drops down from the end of the plate 20 allowing the jaws 6 to be pressed forward by the springs 11 thus swinging the jaws together and gripping the cable 4. As the jaws 6 begin to grip, the cable frictionally draws them forward, thus firmly locking them thereon. In this manner I am able to secure a smooth pick-up owing to the fact that if the car is run faster than the cable the jaws will not grip the cable until the car has lost its momentum and the speed has decreased to exactly that of the cable. If, however, the car should have lost momentum the shock of the checking of the grip will be relieved by the frictional contact of the first approach of the jaws. In dropping the cable the roller 4 encounters another plate 20 which rocks the shaft 13 opening the jaws 6 and holding them open long enough to run past the raised portion of the cable 4 after which the roller 14 leaves the plate 20 at the end thereof and allows the jaws 6 to again close, thus preventing the gripping of the cable at any point where it is not desired.

Various modifications may obviously be made in the construction and operation of my device all without departing from the spirit of my invention if within the limits of the appended claims.

What I therefore claim and desire to secure by Letters Patent is:

1. In an apparatus of the class described a gripping device comprising a pair of longitudinal cable engaging jaws, a plurality of links pivoted to a car at one end and pivotally supporting each of said jaws at the other end, said links being of greater length than the distance between said pivot on said car and said cable, spring surrounded longitudinally disposed members connected to said jaws for thrusting said jaws longitudinally to hold them closed and means for positively opening said jaws.

2. In an apparatus of the class described a gripping device comprising a pair of longitudinal jaws, a plurality of links pivoted to a car at one end and pivotally supporting each of said jaws at the other end, said links being of greater length than the distance between said pivot on said car and said cable, yielding means for thrusting said jaws longitudinally to hold them closed and means for positively opening said jaws, and a rock shaft journaled transversely of the car body and operatively connected with said jaws, an arm on said rock shaft, a roller on said arm and supported adjacent to said trackway, and adapted to engage a stop for rocking said arm to part said jaws.

3. In an amusement apparatus a trackway, a car adapted to be impelled along said trackway, a traction cable operatively supported adjacent to said trackway, a gripping device on said car and comprising a pair of cable engaging jaws, a plurality of links pivoted to said car at one end and pivotally supporting said jaws at the other end, said links being of greater length than the distance between said pivot on said car and said cable, resilient means for thrusting said jaws longitudinally to hold them closed, a rock shaft journaled transversely of the car body and operatively connected with said jaws, an arm on said rock shaft, a roller on said arm and supported adjacent to said trackway, and a stop on said trackway for engaging said roller and rocking said arm to disengage said jaws and free said cable.

4. In an amusement apparatus a trackway, a car adapted to be impelled along said trackway, a traction cable operatively supported adjacent to said trackway, a gripping device on said car and comprising a pair of cable engaging jaws, a plurality of links pivoted to said car at one end and pivotally supporting said jaws at the other end, said links being of greater length than the distance between said pivot on said car and said cable, a coiled spring for holding said jaws closed, a rock shaft journaled transversely of the car body and operatively connected with said jaws, an arm on said rock shaft, a roller on said arm and supported adjacent to said trackway, and a stop on said trackway for engaging said roller and rocking said arm to disengage said jaws and free said cable.

5. In an apparatus of the class described having an endless cable a car adapted to be drawn by said cable a pair of parallel jaws pivoted to said car, means for parting said jaws upon the rearward movement thereof, spring actuated longitudinally disposed members connected to said jaws for normally pressing said jaws forward to cause their approach to each other, and means for positively moving said jaws rearwardly to cause their opening.

6. In an apparatus of the class described having an endless cable a car adapted to be drawn by said cable, a pair of parallel jaws operatively mounted on said car, means for parting said jaws upon the rearward movement thereof, spring actuated members disposed in planes parallel to the jaws for normally pressing said jaws forward to cause the approach to each other, and means for positively moving said jaws rearwardly to cause their opening.

7. In an apparatus of the class described having an endless cable a car adapted to be drawn by said cable, a pair of parallel jaws pivoted to said car to open said jaws upon the rearward movement thereof, means disposed in planes parallel to and rearwardly of said jaws for normally pressing said jaws forward to cause their approach to each other, and means for positively moving said jaws rearwardly to cause their opening.

In testimony whereof I affix my signature in presence of two witnesses.

WILLIAM E. MILLER.

Witnesses:
 HENRY B. STONE,
 RICHARD C. SANDERS.

Copies of this patent may be obtained for five cents each, by addressing the "Commissioner of Patents, Washington, D. C."